United States Patent [19]

Weber

[11] Patent Number: 5,016,904
[45] Date of Patent: May 21, 1991

[54] WHEEL SUSPENSION FOR VEHICLES
[75] Inventor: Georg Weber, Graz, Austria
[73] Assignee: Steyr-Daimler-Puch AG, Vienna, Austria
[21] Appl. No.: 429,416
[22] Filed: Oct. 31, 1989
[30] Foreign Application Priority Data Nov. 11, 1988 [AT] Austria ............................ A2766/88

[51] Int. Cl.⁵ ...................... B60G 11/00; B60G 11/18
[52] U.S. Cl. .................................. 280/664; 280/695; 280/721; 280/723; 267/274
[58] Field of Search ............... 280/690, 691, 695, 700, 280/721, 723, 664; 267/189, 273, 274

[56] References Cited
U.S. PATENT DOCUMENTS

| 2,635,894 | 4/1953 | Jackman | 280/664 |
| 3,071,366 | 1/1963 | Loehr | 280/721 |
| 4,470,616 | 9/1984 | Kaneko et al. | 267/273 |
| 4,700,796 | 10/1987 | Morlok et al. | 280/723 |

FOREIGN PATENT DOCUMENTS 375601 8/1984 Austria .
820378 9/1951 Fed. Rep. of Germany ...... 280/700
852043 8/1952 Fed. Rep. of Germany .
3148388 6/1983 Fed. Rep. of Germany .
3641505 6/1987 Fed. Rep. of Germany .

Primary Examiner—Charles A. Marmor
Assistant Examiner—Tamara L. Finlay
Attorney, Agent, or Firm—Marmorek, Guttman & Rubenstein

[57] ABSTRACT

A wheel suspension for vehicles comprises for each wheel a wheel control arm, which is pivotally movable against the torsional force exerted by a torsion bar. The torsion bar extends transversely to the wheel control arm and is fixed against rotation at a distance from the wheel. In order to reduce the manufacturing costs and the weight of the wheel suspension, the wheel control arm and the torsion bar are integrally combined in an L-shaped component, which is provided adjacent to its apex with a pivotal mounting, which together with mounting for non-rotatably fixing a free end of the torsion bar defines a pivotal axis for the wheel control arm.

7 Claims, 3 Drawing Sheets

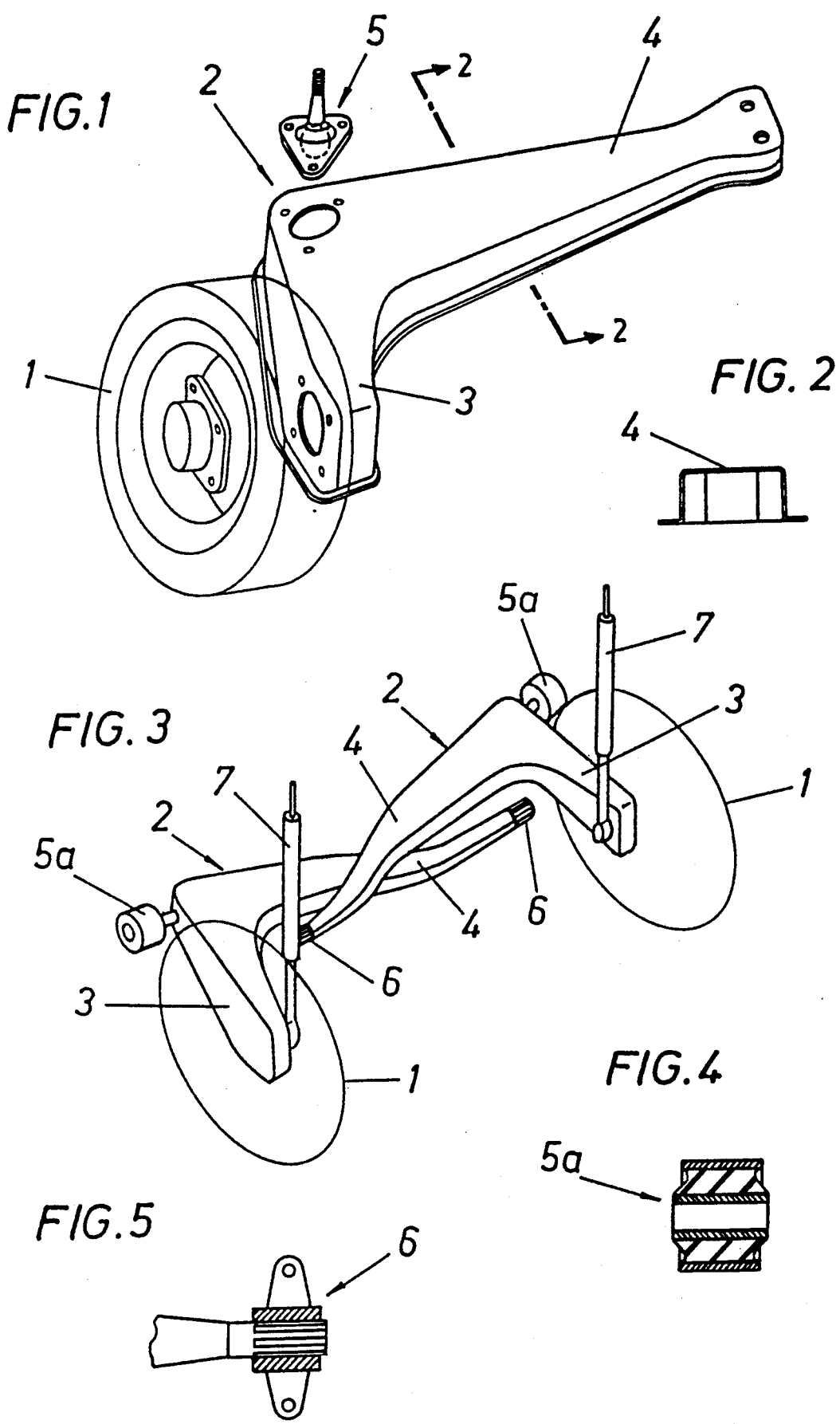

WHEEL SUSPENSION FOR VEHICLES

BACKGROUND OF THE INVENTION

1. Field of the Invention

This invention relates to a wheel suspension for vehicles, comprising for each wheel of an axle a wheel control arm, which is pivotally movable against a force exerted by a torsion bar, which extends transversely to the wheel control arm. The control arm and the torsion bar constitute an integral component, which adjacent to an apex is provided with a pivotal mounting, which together with a non-rotatably mounted portion of the torsion bar defines a pivotal axis for the control arm.

2. Description of the Prior Art

A known wheel suspension of that kind is disclosed in DE-A-31 48 388 and serves to suspend both wheels of an axle. Two control arms are associated with respective wheels and constitute longitudinal control arms, which are interconnected by the torsion bar so that the two control arms and the torsion bar, which extends transversely to the direction of travel of the vehicle, constitute a single platelike member, which is rectangular in cross-section. The torsion bar portion of that member is rigidly and non-deformably secured to the chassis or to another stationary part of the vehicle so that a torsion bar extending as far as to the center of the vehicle is functionally associated with each wheel. Because the member is platelike, the control arms for the two wheels have a relatively low bending strength and they must be connected and stiffened by a beam which extends transversely to the direction of travel of the vehicle. Such beam will obviously add to the structural expenditure and weight of the suspension. Another disadvantage resides in that each of the torsion bar portions which are associated with respective wheel control arms can have only a limited length as that portion may extend in any case only as far as to the center of the vehicle, where the torsion bar is secured to the chassis or to another stationary part of the vehicle. Finally, the known wheel suspension can be provided only with longitudinal control arms and the portions consisting each of a wheel control arm and a portion of the torsion bar cannot be arranged in a freely selectable spatial orientation.

On the other hand, it is known from AT-B-375,601 to associate with each wheel of an axle a separate component, which consists of a wheel control arm and a orsion bar. But that known component is a composite assembly. The wheel control arm consists of a longitudinal control arm and is pivoted in a bearing sleeve, which is fixedly connected to the chassis or to another stationary part of the vehicle and which for the pivot pin of the longitudinal control arm provides two spaced apart bearings for taking up forces from the wheel. The torsion bar pin is non-rotatably keyed to the pivot pin of the longitudinal control arm and at its end that is remote from the wheel is fixed in a mounting that is non-rotatably connected to the chassis or another stationary part of the vehicle. That wheel suspension is relatively complicated and comprises a bearing sleeve providing two bearings for the pivot of the wheel control arm and comprises additional means by which the wheel control arm and the torsion bar are interconnected. Resides, certain difficulties arise in connection with the means by which the control arm is supported against the forces from the wheel because owing to reasons of design the two bearings in the bearing sleeve must be relatively closely spaced apart.

It is finally known, e.g., from DE-A-36 41 505 to combine a longitudinal control arm and a transversely extending torsion bar in a single member. But such members have been used only as stabilizers, which require the provision of a separate wheel spring for each wheel so that the structural expenditure will greatly be increased.

SUMMARY OF THE INVENTION

It is an object of the invention to eliminate all disadvantages outlined hereinbefore and to provide a wheel suspension which is of the kind described first hereinbefore and serves to suspend the wheels of an axle in a vehicle and which can be manufactured at much lower cost and is lighter in weight than the known wheel suspensions used for that purpose and permits the spring stiffness and the kinematics to be more freely selected.

It is another object of the invention to provide such a wheel suspension in which each wheel control arm may selectively constitute a longitudinal, semi-trailing, or transverse control arm.

Said objects are accomplished in accordance with the invention in that a component consisting of a torsion bar and only one wheel control arm is associated with each wheel and said component is a hollow L-shaped member, which gradually tapers from its apex portion toward the free ends of each of its legs.

The L-shaped member which is associated with each wheel constitutes a simple component which serves to control and resiliently suspend the wheel. As such L-shaped member may be mounted in any desired spatial orientation, the wheel control arm may constitute a longitudinal control arm, a semi-trailing control arm or a transverse control arm. As the length of the torsion bar is not limited by its fixation at the center of the vehicle, the spring stiffness may be selected to suit the requirements in each case. There is no need for additional elements connecting the control arms which are associated with the wheels of an axle. Each leg of the L-shaped member may be designed to have such a cross-sectional shape and such a configuration that the member will have the strength required to resist the wheel forces to be expected and will also have the required torsion spring characteristics.

BRIEF DESCRIPTION OF THE DRAWING

FIG. 1 is a perspective view showing a component in accordance with the invention.

FIG. 2 is a transverse sectional view taken on line 2—2 in FIG. 1.

FIG. 3 is a simplified perspective view showing the suspension of both wheels of an axle.

FIG. 4 is an axial sectional view showing a pivotal mounting for the wheel suspension of FIG. 3.

FIG. 5 is an axial sectional view showing the means for non-rotatably fixing the torsion bar.

DETAILED DESCRIPTION OF THE PREFERRED EMBODIMENTS

Figure 6:
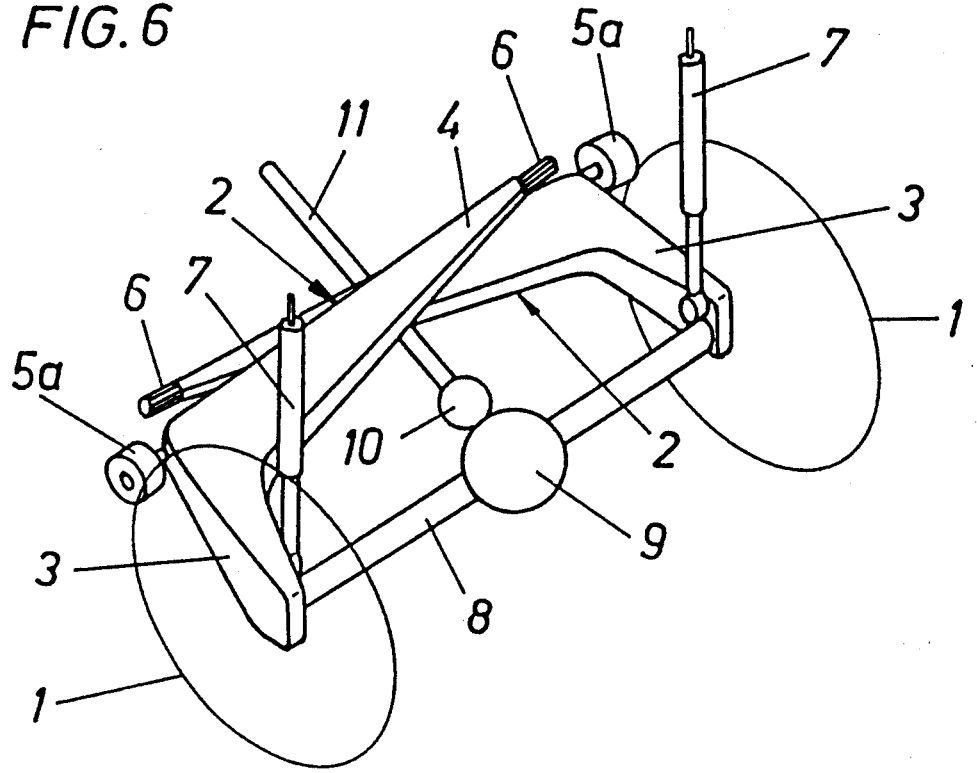
FIG. 6 is a diagrammatic perspective view showing the wheel suspension for a driven rigid axle.

Illustrative embodiments of the invention are shown on the drawing.

In accordance with FIG. 1 a wheel 1 of a vehicle is suspended by a component 2, which comprises a longitudinal wheel control arm portion 3 and a torsion bar portion 4, which extends transversely to the longitudinal control arm portion 4. The component 2 may consist of a pressed member or of a hollow injection molding or die casting, which is torsionally elastic but flexurally stiff and may consist of plastic. The component 2 has an apex portion and at said apex portion is provided with a pivotal mounting 5, which consists of a ball joint. At its free end, which is remote from the wheel, the torsion bar portion 4 is non-rotatably secured to the chassis, not shown, of the vehicle.

The wheel suspension shown in FIG. 3 comprises semi-trailing control arms because a pivotal mounting 5a and the holder 6 for non-rotatably fixing the free end of the torsion bar portion 4 define for the control arm portion 3 of each component 2 a pivotal axis which is oblique to the direction of travel of the vehicle. A shock absorber 7 is associated with each wheel 1, which is indicated only by a circle. There is no need for additional springs for suspending the wheels because the spring function of the suspension can substantially be effected by the torsion bar portions 4. In that embodiment the pivotal mountings 5a consist of mountings of metal-clad rubber rather than of ball joints 5.

As is shown in FIG. 6 the wheel suspension in accordance with the invention may be used also with a driven rigid axle 8. An axle differential 9 is connected by a universal joint 10 to a propeller shaft 11.

Figure 7:
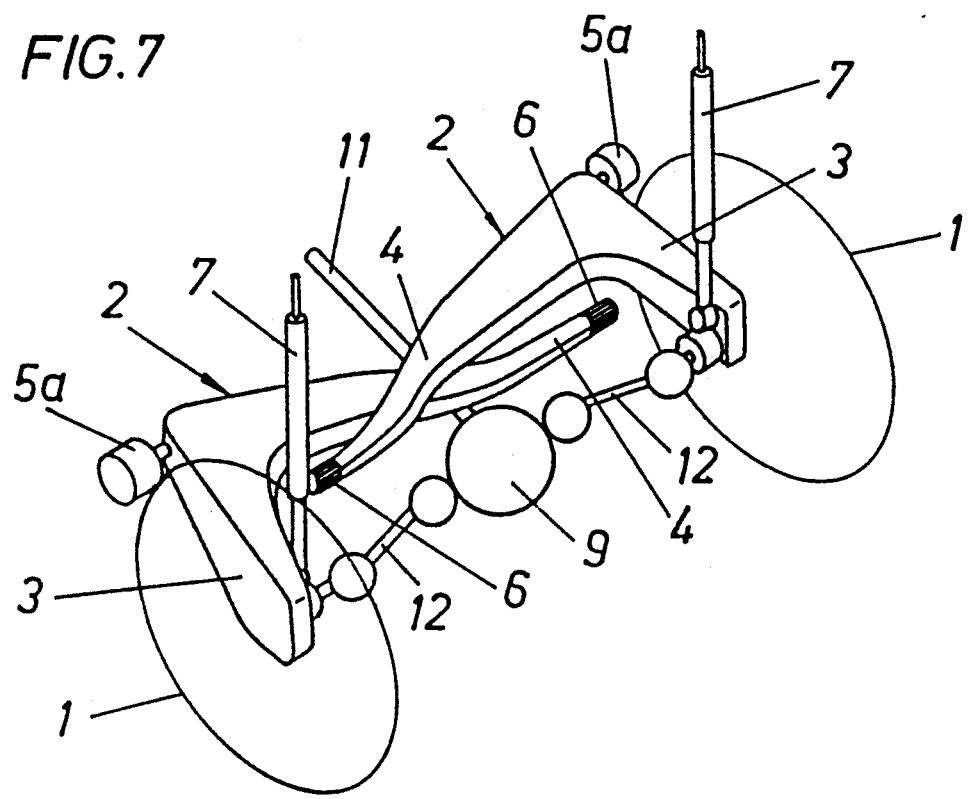
FIG. 7 is a diagrammatic perspective view showing a wheel suspension comprising semi-trailing control arms.

FIG. 7 shows a wheel suspension having semitrailing control arms and used with an axle having two parts connected by an articulated joint. Drive shafts 12 extend from the differential 9 and are connected by universal joints to respective wheels 1.

Figure 8:
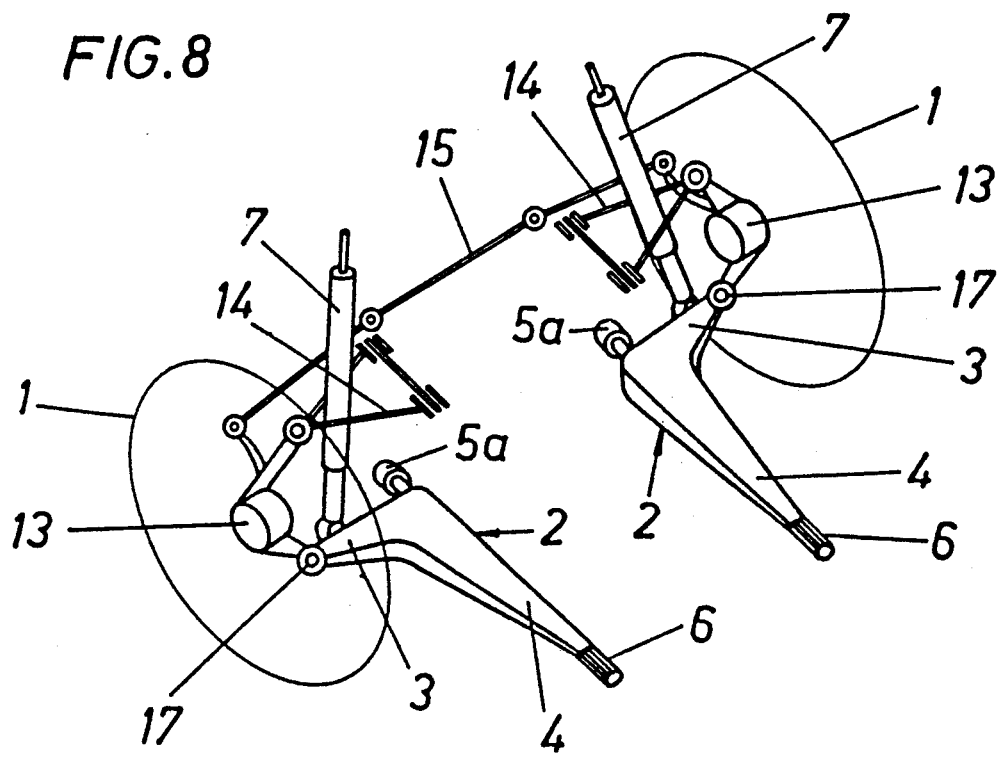
FIG. 8 shows a wheel suspension having double transverse control arms for a steerable front axle.

In accordance with FIG. 8 the components 2 are so arranged that their control arm portions 3 are transverse to the direction of travel of the vehicle and the pivotal axes extend in said direction of travel. The wheel suspension thus comprises transverse control arms, and additional upper transverse control arms 14 are associated with respective wheel carriers 13. Because the wheels 1 can be steered, a track rod 15 is also provided.

Figure 9:
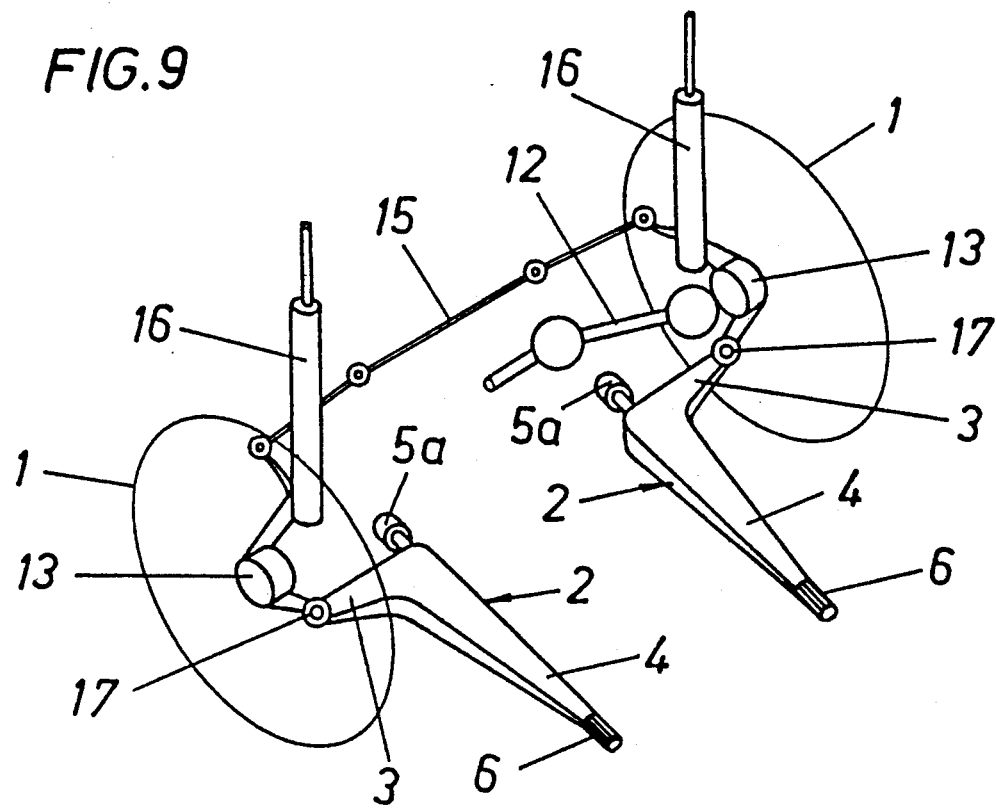
FIG. 9 is a simplified perspective view showing a wheel suspension for an axle provided with spring struts.

The components 2 shown in FIG. 9 are also inherently resilient and comprise transverse control arms but a further control of the wheels is effected by spring struts 16 rather than by upper transverse control arms. The wheels shown in FIG. 9 may consist of driven wheels, as is indicated by the drive shafts 12. In either case, the control arm portion 3 of the component 2 is mounted on the wheel carrier 13 by a ball joint 17.

I claim:

1. A wheel suspension for use in a vehicle, comprising
   a substantially L-shaped hollow member associated with each wheel on an axle, said L-shaped member having an apex portion and first and second legs extending therefrom, said first leg constituting a torsion bar and said second leg constituting a wheel control arm which extends from said apex portion transversely to said torsion bar, said wheel control arm being integral with said torsion bar,
   each of said legs having a free end remote from said apex portion,
   said torsion bar being of rectangular cross-section which gradually tapers from said apex portion to its free end,
   torsion bar holding means adjacent to said free end of said torsion bar for holding said torsion bar against rotation at a distance from said apex portion, and
   pivotal mounting means for defining with said torsion bar holding means a pivotal axis for said wheel control arm.

2. The wheel suspension of claim 1 wherein said free end of said torsion bar extends beyond a midpoint of said axle.

3. The wheel suspension of claim 1 wherein said torsion bar is curved.

4. The wheel suspension of claim 1 wherein said pivotal axis is substantially perpendicular to a direction of travel of said vehicle and said wheel control arm is a longitudinal wheel control arm.

5. The wheel suspension of claim 1 wherein said pivotal axis is substantially parallel to a direction of travel of said vehicle and said wheel control arm is a transverse wheel control arm.

6. The wheel suspension of claim 1 wherein said pivotal axis is oblique to a direction of travel of said vehicle and said wheel control arm is a semi-trailing wheel control arm.

7. An axle assembly for a vehicle, comprising
   an axle structure having opposite ends,
   first and second wheels rotatably mounted on said axle structure at said opposite ends,
   a wheel suspension for each of said wheels, said wheel suspension comprising
   a substantially L-shaped hollow member associated with each wheel on said axle, said L-shaped member having an apex portion and first and second legs extending therefrom, said first leg constituting a torsion bar and said second leg constituting a wheel control arm which extends from said apex portion transversely to said torsion bar, said wheel control arm being integral with said torsion bar,
   each of said legs having a free end remote from said apex portion,
   said torsion bar being of rectangular cross-section which gradually tapers from said apex portion to its free end,
   torsion bar holding means adjacent to said free end of said torsion bar for holding said torsion bar against rotation at a distance from said apex portion, and
   pivotal mounting means for defining with said torsion bar holding means a pivotal axis for said wheel control arm.

* * * * *